United States Patent Office 3,085,892
Patented Apr. 16, 1963

3,085,892
JOINT SEALANT FOR GAS MAINS
Donald Lloyd White, Bethesda, Md., and Harry Lorain Ketcham, Jr., Annandale, and Howell Farley Horn, Falls Church, Va., assignors to Washington Gas Light Company, Washington, D.C., a corporation of the District of Columbia
No Drawing. Filed Sept. 30, 1960, Ser. No. 59,524
4 Claims. (Cl. 106—278)

This invention relates to a joint sealant and more particularly to such a material intended primarily for reworking and sealing the joints in buried castiron gas mains and the like where leakage of gas has become excessive due to ageing and/or drying out of the joint packing and sealing materials.

It is a general object of the present invention to provide a novel and improved joint sealant for reworking the joints of in-place mains used for the delivery of manufactured and/or natural gas or the like.

More particularly it is an object of the invention to provide an improved joint sealant capable of being pumped into buried gas mains, or the like, having packed joints, of either the bell and spigot type or similar arrangements packed with jute fiber and lead, placed under pressure in the flooded main in order to penetrate the interstices, cracks and small voids in the joint packing and after remaining under pressure for a suitable period drained or pumped out for reuse.

Another important object of the invention resides in the provision of a joint sealant, fluid at normal temperatures, easily handled and capable of hardening on contact with the atmosphere when seeping through joints, cracks or leaky spots in pipe connections.

A further important object of the invention comprises the composition of the joint sealant wherein it is resistant to reaction with the materials carried normally in the pipe, does not harden and crack during use and resists drying from exposure to dehydrated gases.

Other and further objects and features of the invention will be more apparent to those skilled in the art upon a consideration of the following specification and the appended claims wherein are disclosed exemplary embodiments of the invention with the understanding that such changes and modifications may be made in the composition thereof as fall within the ranges of the examples and the scope of the appended claims, without departing from the spirit of the invention.

Buried gas or similar pipe mains are usually made up of sections joined by bell and spigot joints packed with jute or a like material and calked with lead or cement. In the use of such mains for the delivery of manufactured gas or natural gas certain changes in conditions of the materials delivered often have deleterious effects on the joint material. Thus, mains which were laid and the joints designed for satisfactory service with manufactured or so-called coal gas which was always enriched with certain oils to increase its illuminating effect and/or its B.t.u. content remained tight over a long period of years because the packing material was kept moist and fully expanded by being saturated with condensate from the oil enrichment. When such mains are subsequently used for the delivery of natural gas, which does not require enrichment and which as a consequence is extremely dry, the previously satisfactory joints may become dried out by evaporation into the dry gas being transmitted and leakage may occur which can become increasingly worse as time progresses. Moreover, gas distributors, faced by rapid growth of cities and suburbs have been forced to increase the pressure of the gas being delivered, as additional services were connected to and beyond the original ends of the mains, in order to be able to deliver the required quantity without replacing the mains with those of larger diameter. Thus, leakage, which was only a small percentage of the total amount of gas used, increased until it became an undesirably large percentage requiring something to be done to reduce or eliminate it. Several alternatives appeared, the first being to dig up the covering soil and/or pavement over the joints and rework the joint with new packing materials, or second, if service was not to be interrupted applying a joint clamp of which various types are available. A third alternative involves the use of some form of joint sealant which can be introduced into the interior of the pipe and forced through the leakages to seal them.

The sealant of the present invention, developed to supplant those found inferior and, indeed, wholly unsatisfactory at times, has proven much superior after service and field tests in castiron gas mains of 12 inches or more in diameter, under severe conditions of operation including relatively high pressures, increased quantity of gas flow, in situations in which natural gas has succeeded oil enriched manufactured gas in the mains, and when vibration is excessive since the mains so treated have been buried beneath heavily travelled streets and within less than a foot of the castiron yokes carrying streetcar rails heavily travelled as much as 20 hours a day.

The new sealant is a liquid, at normal temperatures, and is applied to sections of mains several hundred feet long, isolated for the purpose, pumped full of the liquid and maintained under substantial pressure for a suitable period after which the pressure is released and all excess liquid drained or pumped out leaving a coating on the interior of the main and over all joints as well as filling the pores, voids, cracks, etc. therein.

The volatile materials in the sealant evaporate quickly when the material is spread in a film that has considerable area per unit volume. Upon loss of the solvents the tar-enamel residuum becomes a soft plastic material that effectively seals the joint. In order to promote rapid evaporation and removal of the solvent after the sealant has been drained from the line a flow of natural gas is produced through the line to scavenge the solvent vapors. The effluent gas is burned in special burners outdoors. When the solvent vapors in the effluent gas have been reduced to negligible quantities the now leak-free main section can be returned to service.

The preferred composition of the joint sealant is as follows:

Coal tar enamel, by volume 47%, suitable range 40% to 50%

Oil gas tar, by volume 33%, suitable range 30% to 40%

Monochlorobenzene, $C_6H_5Cl$ by volume 10%, suitable range 8% to 15%

Benzene, $C_6H_6$, by volume 10%, suitable range 8% to 15%

The viscosity of the product at 100° F. is substantially 400 S.S.U.; its specific gravity is slightly greater than water.

Coal tar enamel is a material complex chemically, solid at normal atmospheric temperatures and is used in coating steel pipes and the like where it must be used heated and kept agitated to prevent settlement.

The chemical composition of the coal tar enamel preferred for use in the present invention is as follows:

Coal tar pitch _____ wt. percent __ 50
Heavy aromatic oil _____ do ____ 13
Medium volatile coal (finely powdered) _____ do ____ 12
Hydrous magnesium and aluminum silicates __ do ____ 25

Physical Characteristics

| Specified Test | Test Method | Limits |
| --- | --- | --- |
| 1. Specific Gravity at 25° C | A.S.T.M., D-71 | 1.45 to 1.50. |
| 2. Pounds per gallon at 25° C | | 12.0 to 12.5. |
| 3. Softening Point, ASTM | A.S.T.M., D-36 | |
| 4. Penetration: | | |
| 77° F., 100 g., 5 sec | A.S.T.M., D-5 | 2 to 7. |
| 115° F., 50 g., 5 sec | | 6 to 28. |
| 5. Ash, Mineral Filler, percent by wt. | A.S.T.M., D-271 | 20 to 27. |
| 6. High Temperature Sag Test, 24 hrs. at 140° F. | | 0 to 1/16". |
| 7. Cold Test | MIL-P-15147-C | No cracking or disbonding. |
| 8. Adhesion—Room Temperature to 140° F. | MIL-P-15147-C | No stripping |
| 9. High Voltage Test (10,000 volts low amperage, pulse type generator). | | No voids or break through at 100 mils. |

Oil gas tar preferred for use in the present invention has the following properties:

Specific gravity, 60° F./60° F _____ 1.143
Water content, wt. percent _____ 1.3
Distillation on dried tar (ASTM–D–20):
    Initial boiling point, ° C _____ 138
    I.B.P.—160°, wt. percent _____ 0.0
    160–235° C., wt. percent _____ 10.8
    235–270° C., wt. percent _____ 14.8
    270–300° C., wt. percent _____ 8.7
    Pitch, wt. percent _____ 64.3
    Recovery, wt. percent _____ 98.6
Distillate (I.B.P.—300° C.) properties:
    Gravity, 60° F./60° F _____ 0.994
    API _____ 10.8
    Sulfonation index, ml./100 g. tar _____ 1.5
    Ultimate analysis:
        Carbon, wt. percent _____ 91.71
        Hydrogen, wt. percent _____ 7.75
        C/H ratio _____ 11.83
Pitch (300° C.+) properties:
    Quinoline insoluble, wt. percent _____ 14.9
    Acetone insoluble, wt. percent _____ 35.2
    Ultimate analysis:
        Carbon, wt. percent _____ 93.46
        Hydrogen, wt. percent _____ 5.03
        C/H ratio _____ 18.58

Methods of Formulation

The oil gas tar is heated to approximately 300° F. The enamel is heated until it is fluid and is then mixed with the tar by continuous stirring. After the mixture of tar and enamel has cooled to approximately 250° F., the monochlorobenzene which is compatible with the tar-enamel mixture is added to reduce the viscosity of the mixture. When a uniform density is achieved the material is allowed to cool to 150° F. and the benzene is added with agitation. Benzene is not readily miscible with the tar-enamel mixture alone, but is compatible after the addition of the monochlorobenzene.

The monochlorobenzene is primarily a volatile solvent for the oil-gas tar and enamel mixture and obviously other suitable solvents such as pyridine or other suitable halogenated aromatic hydrocarbons may be used.

The benzene is used solely as a high volatile diluent to reduce the viscosity of the final mixture to that desired and may be supplanted by a similar quantity of low flash naphtha or other low boiling aromatic solvent.

We claim:
1. A sealant for reworking the joints of in-place, cast-iron gas mains to eliminate leakage through the joint packing material consisting of a mixture by volume of: 40% to 50% of coal tar enamel, 30% to 40% of oil gas tar, 8% to 15% of monochlorobenzene, and 8% to 15% of benzene, said coal tar enamel consisting essentially of about 50% coal tar pitch, about 25% hydrous magnesium and aluminum silicates and the balance to 100% by weight substantially evenly divided between heavy aromatic oil and finely divided medium volatile coal.

2. A sealant for the joint packing of in-place bell and spigot pipe mains consisting of a mixture by volume of: 47% of coal tar enamel, 33% of oil gas tar, 10% of monochlorobenzene, and 10% of benzene, said coal tar enamel consisting essentially of about 50% coal tar pitch, about 25% hydrous magnesium and aluminum silicates and the balance to make 100% by weight substantially evenly divided between heavy aromatic oil and finely divided medium volatile coal.

3. A joint sealant consisting essentially of a mixture by volume of: 40% to 50% of coal tar enamel, 30% to 40% of oil gas tar, and 16% to 30% of a solvent-diluent of high volatility having a benzene base, said coal tar enamel consisting essentially of about 50% coal tar pitch, about 25% hydrous magnesium and aluminum silicates and the balance to make 100% by weight substantially evenly divided between heavy aromatic oil and finely divided medium volatile coal.

4. A joint sealant consisting essentially of a mixture of ingredients by volume of: 40% to 50% of coal tar enamel which consists essentially of about 50% coal tar pitch, about 25% hydrous magnesium and aluminum silicates and the balance to make 100% by weight substantially evenly divided between heavy aromatic oil and finely divided medium volatile coal; 30% to 40% of coal gas tar; 8% to 15% of a volatile solvent for the first two ingredients; and 8% to 15% of a volatile diluent for the above three ingredients.

References Cited in the file of this patent
UNITED STATES PATENTS 2,446,903     Bright _____ Aug. 10, 1948
2,894,848     Goodwin et al. _____ July 14, 1959